Dec. 29, 1964   N. P. S. STRAUSSLER   3,163,199
VEHICLE WHEEL
Filed Aug. 8, 1963   3 Sheets-Sheet 1
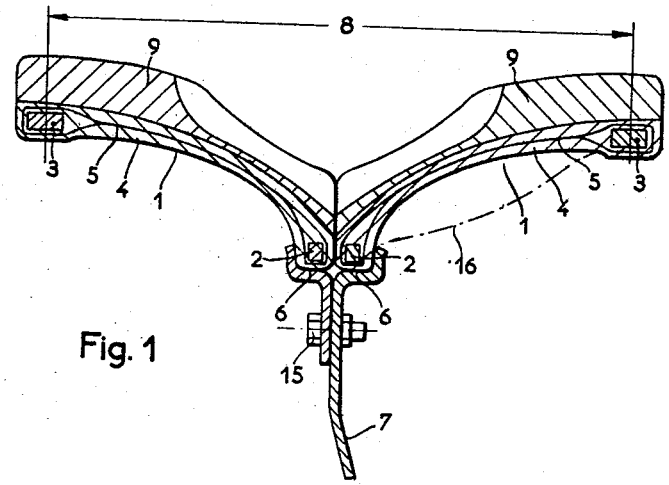
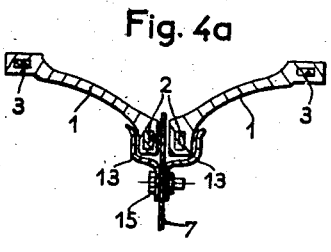
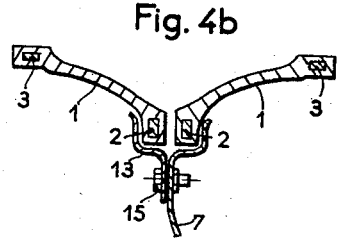
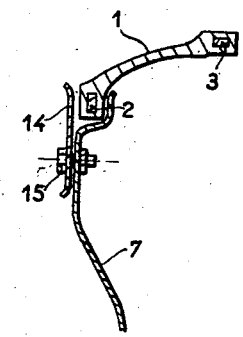
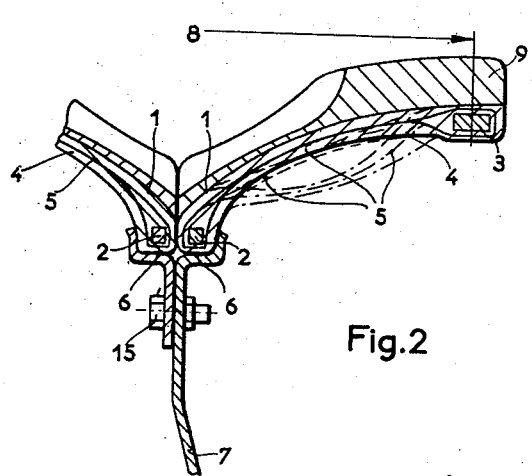

Dec. 29, 1964 N. P. S. STRAUSSLER 3,163,199
VEHICLE WHEEL
Filed Aug. 8, 1963 3 Sheets-Sheet 2

INVENTOR
NICHOLAS P.S. STRAUSSLER
BY

Dec. 29, 1964  N. P. S. STRAUSSLER  3,163,199
VEHICLE WHEEL
Filed Aug. 8, 1963  3 Sheets-Sheet 3
Fig. 7
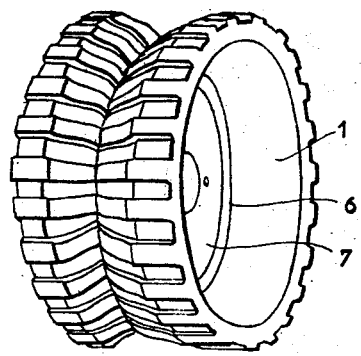
Fig. 8
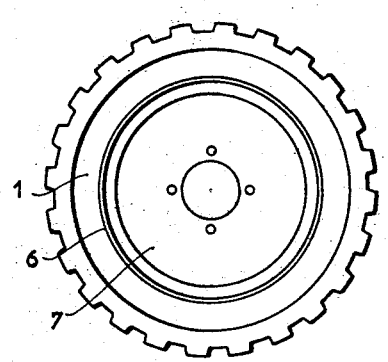
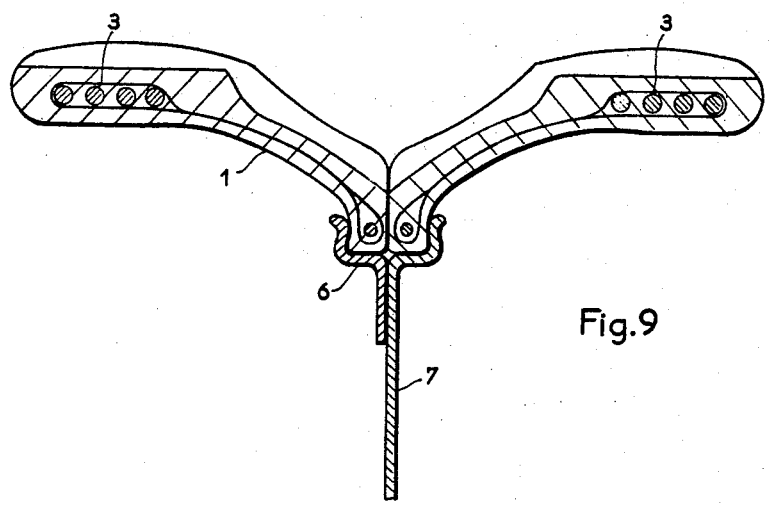
Fig. 9
INVENTOR
NICHOLAS P. S. STRAUSSLER

United States Patent Office 3,163,199
Patented Dec. 29, 1964

3,163,199
VEHICLE WHEEL
Nicholas Peter Sorrell Straussler, 5 Clarges St.,
London W.1, England
Filed Aug. 8, 1963, Ser. No. 300,801
Claims priority, application Great Britain, Aug. 16, 1962,
31,423/62; Feb. 5, 1963, 4,602/63
10 Claims. (Cl. 152—324)

The invention relates to a vehicle wheel consisting of a rim and a tire containing no air under pressure.

According to the invention, the vehicle wheel comprises at least one non-pneumatic tire having a shell-, dish- or bell-shaped carcass or tread body adapted to carry the load by the entire periphery and lying on the rim seat two by two, with their bottoms arranged back to back, or singly, and clamped between substantially radially extending flanges provided on the rim, the said carcass being optionally reinforced, after the manner of a usual tire carcass, by means of inserts, embedded or vulcanised in position, while the outer free edge portion of the carcass, which projects to a substantial extent away from the rim, is stiffened by at least one spring ring member embedded in said edge portion and fastened to the said optional inserts. Owing to the spring rings contained in the outer free edges of the tread bodies, the pressure from the road surface is transmitted to the entire wall of the tread bodies by distorting them as a whole in a substantially upward direction and thus to the entire periphery of the rim or rims.

Further, according to the invention, the longitudinal central section of the tread body has a conical, curved or like shape, with the diameter thereof increasing from the bead core ring to the spring ring, so that two assembled tread bodies provide between them a concave or similarly depressed outer surface area. Each of the said stiffening members is comprised of one or more rings made from resilient material, e.g. of steel-like nature or steel, of suitable cross section, or from similar resilient material wound spirally. Further, according to the invention, the tread body is built up as a homogeneous or a multi-layer body and may be provided with reinforcing inserts of cotton, silk, synthetic material and/or steel cord or any other suitable material. In order to increase the adhesion of the tread bodies they are provided with a tread pattern. The vehicle wheel may be formed of a single structure comprising two tread bodies. The rim may include a flat wheel disc member extending up to the clamping area of the tread bodies and having fastened to one or either face of it an offset flanged ring for securing one or two tread bodies, so that one of the tire bodies may be detached and the other one left in position for use. According to a further embodiment of the invention, two tread bodies taking up the load jointly are arranged individually upon rims adapted to rotate independently from each other, one of which may be non-rotatably secured to the axle supporting the rims. An improvement may be achieved by the use of materials, such as foamed materials, adhered to the wall of the tread bodies in the inner cavities thereof and screening such cavities entirely or partly from the outside.

The vehicle tire as described has springing characteristics meeting the requirements of its intended use. Such a tire is resistant to injury and is less liable to be destroyed by an external violent action such as a shot. Also, the vehicle remains driveable even if one of the halves becomes "entirely destroyed."

A few embodiments of the invention are illustrated by way of example in the accompanying drawings, in which:

FIG. 1 is a fragmentary sectional view of a vehicle wheel including a pair of tread shells centered on a rim;

FIG. 2 is a fragmentary sectional view of a vehicle wheel as illustrated in FIG. 1, the tread shells being of a different shape;

FIGS. 4a to 4c and 5 illustrate various junctions and shapes in connection with the vehicle wheel;

FIG. 7 is a perspective view of an embodiment of a wheel and tire according to the invention;

FIG. 8 is a side elevation thereof; and

FIG. 9 is a fragmentary sectional view of an alternative embodiment of a tire according to the invention.

Figure 3:
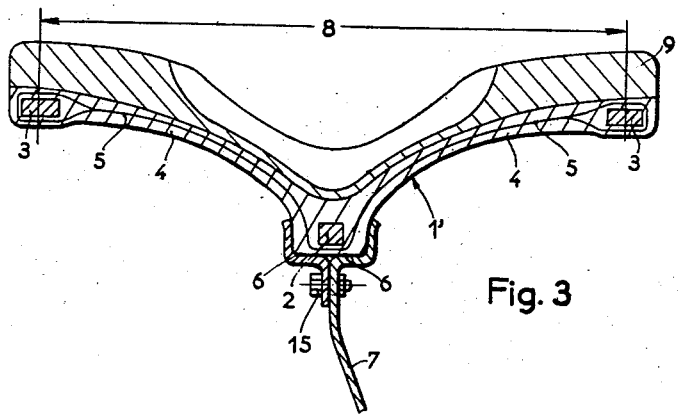
FIG. 3 is a fragmentary sectional view of a vehicle wheel including tread shells forming a single structure.

The components of the vehicle wheel of FIG. 1 which are the subject-matter of the invention substantially comprise a pair of mutually independent hollow, dish- or bell-shaped bodies or shells 1 (FIGS. 1 and 2). The shells are made, as far as the shell body proper 4 is concerned, from rubber-like material, i.e. any suitable known resilient synthetic material or from rubber or rubber compounds, in which there may be embedded in a suitable manner, reinforcement inserts 5 made from cotton, silk, synthetic material, such as nylon, steel wire or cable, depending upon the use contemplated. In the bottom of each shell 1 there is provided, adjacent to the cut-out formed in that bottom and intended for the bead seat, a bead core ring 2, which is united to the reinforcement insert 5, the said bead core ring being embedded by curing the synthetic material or by vulcanizing the rubber, and, if desired, the use of mechanical anchoring means. Each shell 1 has embedded therein, adjacent its outer periphery, core rings made of resilient material of steel-like nature or steel, of suitable cross section, or of resilient wire of similar material wound spirally, which will be hereinafter named briefly "metal core rings" 3.

The metal core rings 3 are made, within the confines of their cross section, whatever be the shape of the latter—solid or hollow. A metal core ring 3 may be made, as a single whole, from resilient material of above specified nature, wound spirally as shown in FIG. 9. The bead core rings and the metal core rings are invariably coaxial with respect to the axis of the shell or the vehicle wheel.

Upon the outer side area of the shells 1 are provided tread coverings 9 of suitable tread pattern, which extend across the whole width of the outer side area or a portion thereof.

The shells 1 engage the seat 6 of rim 7 by means of suitable central cut-outs provided in their bottoms, which are placed contiguously to each other (FIGS. 1 and 2), whereby the shells are centered, the latter being clamped in such location by means of fixing screws 15. The rim 7 is made in two sections parting in an axial direction, one portion of the seat 6 of the rim being allotted to the removable section of the rim. The bottom portion of the rim 7 is removably secured. Instead of shells 1 having the outer end faces of the bottoms arranged the one against the other, one may secure a single shell 1, in similar manner, on the rim 7 provided with a suitably shaped seat 6.

It will be understood that the embodiment of rim illustrated in FIGS. 1 to 3 may be modified by differently arranging and shaping the component parts thereof, or by selecting different materials, or by using securing means other than screws. The arrangements of component parts of the rim and the way they are secured to the wheel disc are diagrammatically illustrated in FIGS. 4a to 4c.

The rim according to FIG. 4a makes it possible either to mount a tire comprised of two shells 1, or to fasten a single shell 1, the selected arrangement depending on whether two offset flanged rings 13 or only one such ring is used.

Figure 5:
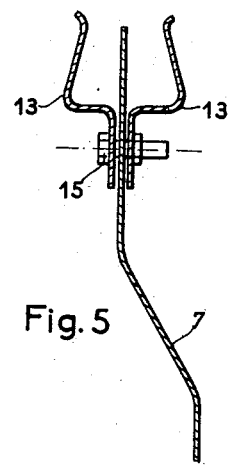

The offset horned rings 13, adapted to receive the beads of the shells 1, need not lie in radial planes, but may be convergent as shown in FIG. 5.

Figure 6:
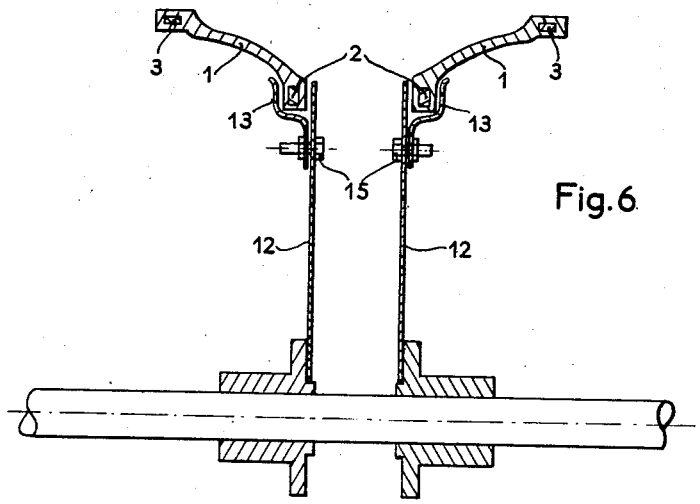
FIG. 6 illustrates a particular form of wheel.

To facilitate steering, a further embodiment of the invention includes two wheel discs 12 (FIG. 6), each provided with one shell 1 and arranged to rotate independently from each other. One of the discs may be mounted non-rotatably on its axle, so that it may transmit driving torque. The other wheel disc 12 is mounted idle on the same axle.

As illustrated by the longitudinal axial section (FIG. 2) the shell 1 may be of varying configuration, e.g. conical, curved or of another suitable shape, such as bulging outwardly or inwardly.

Where two shells 1 are used with a vehicle wheel, they may be made as a single body 1' (FIG. 3), be fitted as a whole on the seat 6 of the rim 7 and fastened to the latter. In this embodiment the bead core ring 2 may also be shaped and arranged as shown in FIG. 3.

When the tire defined by the shells 1 (FIGS. 1 to 3) is put under load, the relatively rigid metal core rings 3 become displaced eccentrically with respect to the bead core rings 2 clamped to the rim 7; the plane in which the metal core rings 3 lie sets itself at an angle to the plane of the bead core rings 2. Such shift is opposed by the elastic recovery force of the whole of the shell 1, which force grows as the relative shift of the metal core rings 3 with respect to the bead core rings 2 increases. Obviously, by producing the shells 1 suitably as far as the characteristics of the materials of the shells are concerned, one may influence in every desired manner those recovery forces of the shells that counterbalance the wheel load, e.g. by selecting a material for the shells that has a modulus of elasticity suited for the desired effect, by adapting the thread angle and/or by suitably selecting the thickness, the number and the quality of the reinforcement inserts.

The spring characteristic of the tire comprised of one or two shells 1 (FIGS. 1 to 3) may be made to meet required conditions by selecting at will the difference in diameters between the bead core rings 2 and the metal core rings 3, the spacing 8 (FIG. 1) of the shells 1 proper and the shape of the latter, which shells may exhibit varying curvatures, for instance (FIG. 2).

The resilient metal core rings 3 transmit the wheel load acting upon them to the entire periphery of the shells 1 and, as a general rule, undergo at the same time a distortion from circular to oval, while getting slightly flattened at the point of contact with the ground. Such distortions of the metal core rings 3 may be caused to take place to such extent as may be desired by properly selecting the material and the cross section of the metal core rings.

It is evident that the springing characteristics of the tire is due to the axial offset between the portion of the dished carcass which is commencing to flex at or near the fixation of the carcass to the rim and the outer free edge which is reinforced by the spring ring or rings where the flexing and the distortion of the carcass is maximum.

This offset distance must be relatively substantial in order that the movement of the spring ring or rings be mainly in the springing or vertical direction.

Under load the spring ring changes from the unladen circular shape to an oval which flattens most at the portion near the road surface and distends at both sides and changes least at the top. Most of the load transfer from the rim to the spring rings is carried by the two side portions of the carcass.

The hollow space—opening outwardly as a rule—of each shell 1 may be more or less filled or screened tightly from the outside, using a material which has no effect upon the operation of the vehicle tire, e.g. elastic foamed materials, such as synthetic foamed materials or the like (16, FIG. 1) to prevent the collection of dirt in the hollow space.

What I claim is:

1. A vehicle wheel comprising a rim and at least one non-pneumatic tire made from rubber-like material and having a bead clamped between substantially radially extending flanges provided on said rim, each said tire having a deep-dished carcass extending radially and axially away from said bead, the outer free edge portion of said carcass being stiffened by at least one spring ring member made from mechanically resistant material and capable of changing its form, under load, from circular to an oval which flattens most at the portion near the road surface, there being a substantial axial off-set between the portion of said carcass adjacent to the rim and said outer free edge portion including at least said one spring ring member.

2. A vehicle wheel is claimed in claim 1, in which a substantial portion of the outer peripheral surface of the tire, which is located closest to the rim, has a cone-like form.

3. A vehicle wheel as claimed in claim 1, in which two tires having a deep-dished carcass are arranged on the rim with their bead portions arranged back to back.

4. A vehicle wheel as claimed in claim 1, in which the tire has two deep-dished carcasses extending radially and axially away from a common bead.

5. A vehicle wheel as claimed in claim 3, in which a radial flange rigid with said rim is arranged between the beads of said tires.

6. A vehicle wheel as claimed in claim 1, in which each said spring ring member has the form of a spirally wound spring.

7. A vehicle wheel as claimed in claim 1, in which each said spring ring member is made from steel like material.

8. A vehicle wheel as claimed in claim 1, in which the wheel comprises two mutually axially spaced rims, a tire having a deep-dished carcass being mounted on each rim, the tires having their beads located closest to each other.

9. A vehicle wheel as claimed in claim 8, in which the two rims are arranged to rotate independently from each other.

10. A vehicle wheel as claimed in claim 1, in which elastic foamed material is adhered to at least part of the inner peripheral surface of each said tire.

References Cited by the Examiner

UNITED STATES PATENTS 1,214,137   1/17   Clawson _____ 152—301

FOREIGN PATENTS 485,891   8/52   Canada.
504,226   4/20   France.

ARTHUR L. LA POINT, *Primary Examiner.*

PHILIP ARNOLD, *Examiner.*